United States Patent
Payton et al.

[15] 3,654,460
[45] Apr. 4, 1972

[54] AUTOMATIC SAMPLE CHANGER FOR A GONIOMETER WITH MEANS TO ACCOMODATE SAMPLES OF DIFFERENT THICKNESSES

[72] Inventors: Charles E. Payton; Waldo C. Patterson, both of Ponca City, Okla.

[73] Assignee: Continental Oil Company, Ponca City, Okla.

[22] Filed: Feb. 12, 1969

[21] Appl. No.: 799,154

[52] U.S. Cl. ............................................250/51.5, 250/49.5
[51] Int. Cl. ....................................H01j 37/20, G01n 23/20
[58] Field of Search ........................250/51.5, 65, 49.52

[56] References Cited

UNITED STATES PATENTS

| | | | |
|---|---|---|---|
| 3,204,097 | 8/1965 | Moffat et al. | 250/51.5 |
| 3,218,458 | 11/1965 | Furnas | 250/51.5 |
| 3,307,036 | 2/1967 | Bouvelle | 250/51.5 |
| 3,340,397 | 9/1967 | Johnston | 250/51.5 |
| 3,391,276 | 7/1968 | Delarue | 250/51.5 |

Primary Examiner—James W. Lawrence
Assistant Examiner—C. E. Church
Attorney—Joseph C. Kotarski, Henry H. Huth, Jerry B. Peterson, William J. Miller, David H. Hill and Craig and Antonelli

[57] ABSTRACT

A sample holder for a goniometer consisting of a drum having a plurality of flats on the circumference of the drum adapted to position the samples properly with respect to an X-ray source and its detector. The drum contains accurate indexing means and an adjustable means for properly positioning the samples vertically to account for a variation in the thickness of a set of samples.

4 Claims, 5 Drawing Figures

PATENTED APR 4 1972

INVENTOR.
CHARLES E. PAYTON
WALDO C. PATTERSON
BY
*William J. Miller*
ATTORNEY

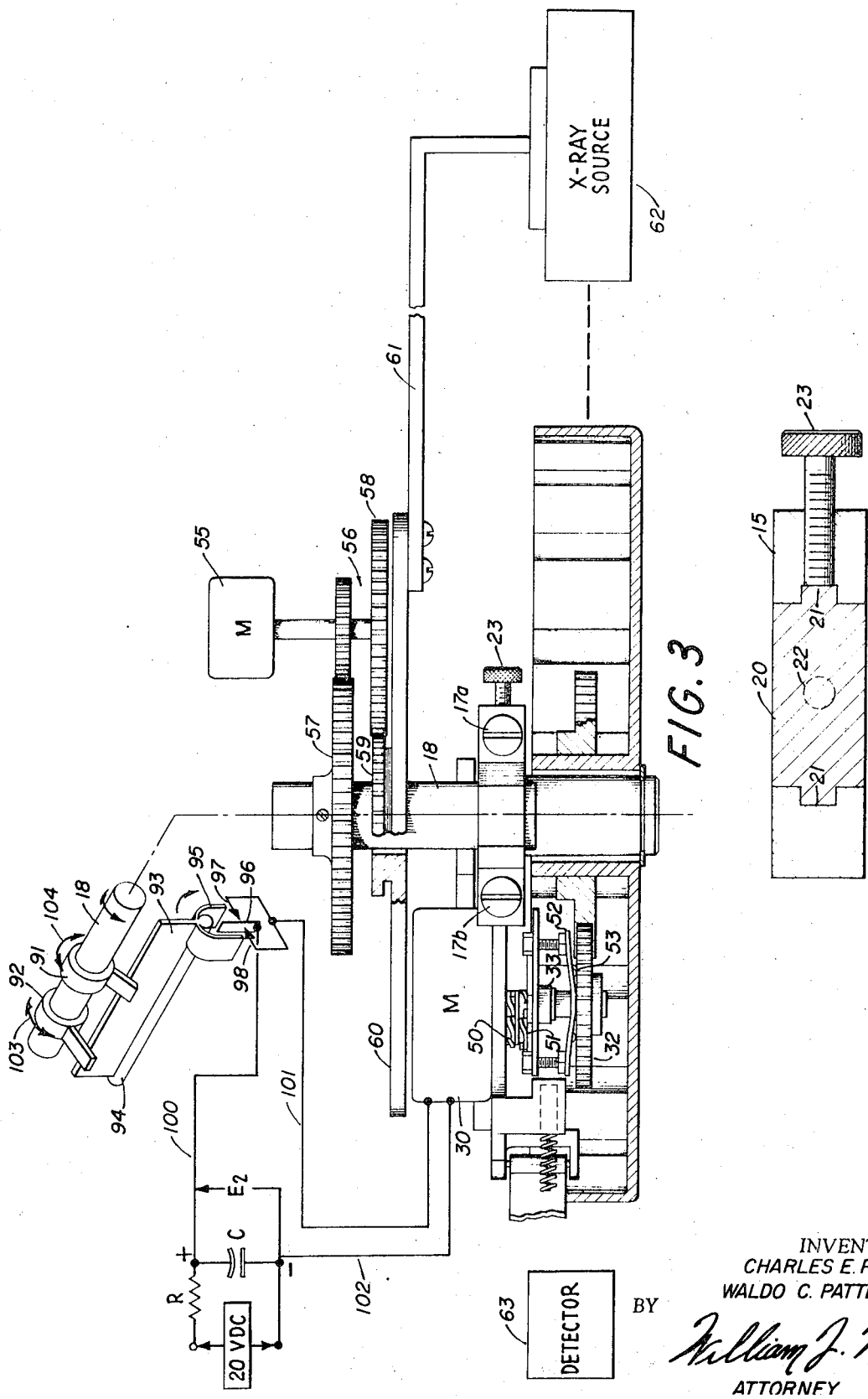

AUTOMATIC SAMPLE CHANGER FOR A GONIOMETER WITH MEANS TO ACCOMODATE SAMPLES OF DIFFERENT THICKNESSES

DESCRIPTION OF THE PRIOR ART

A lot of effort has been expended in an attempt to make an automatic sample changer for a goniometer, or X-ray diffractometer, since the machine operates at a fairly slow rate and usually requires the attendance of a person continuously in order to replace the samples when the operation is complete. The object of any automatic sample changer is to be able to analyze at least 20 specimens accurately and with little or no attendance on the part of an operator during the period of time the samples are being processed. One type of sample changer is disclosed in the patent to Gustaf F. Hague, Jr., U.S. Pat. No. 3,177,360. The X-ray diffractometer disclosed by the Hague patent is substantially identical to the machine for which the sample changer of this invention is adapted. In the above-referenced prior art device, the samples are mounted on a disc and extend radially from the disc. Means are provided for indexing the samples into the proper position for utilization by the goniometer.

SUMMARY OF THE INVENTION

This invention discloses a drum-type sample changer using a precise indexing means, the drum being rotated by a solenoid. Means are provided to compensate for the variation in thickness of a plurality of samples so that each sample, when impinged by the X-ray, will be in the proper position. The sample changer of this invention affords reliable and trouble-free operation, due to the simplicity, adjustability and accurate indexing of the mechanical interconnecting parts.

Other objects and advantages of the invention will be evident from the following detailed description when read in conjunction with the accompanying drawings which illustrate the invention.

BRIEF DESCRIPTION OF THE FIGURES

FIG. 3 is a top view of FIG. 2 with a cross-sectional view of the sample holding drum taken along its diameter and including a representation of the driving gears and switching system for the goniometer; and FIG. 4 is a cross-sectional view of the sample adjusting slidecut through lines 4—4 on FIG. 2.

SPECIFIC DESCRIPTION OF THE DRAWINGS

Figure 2:
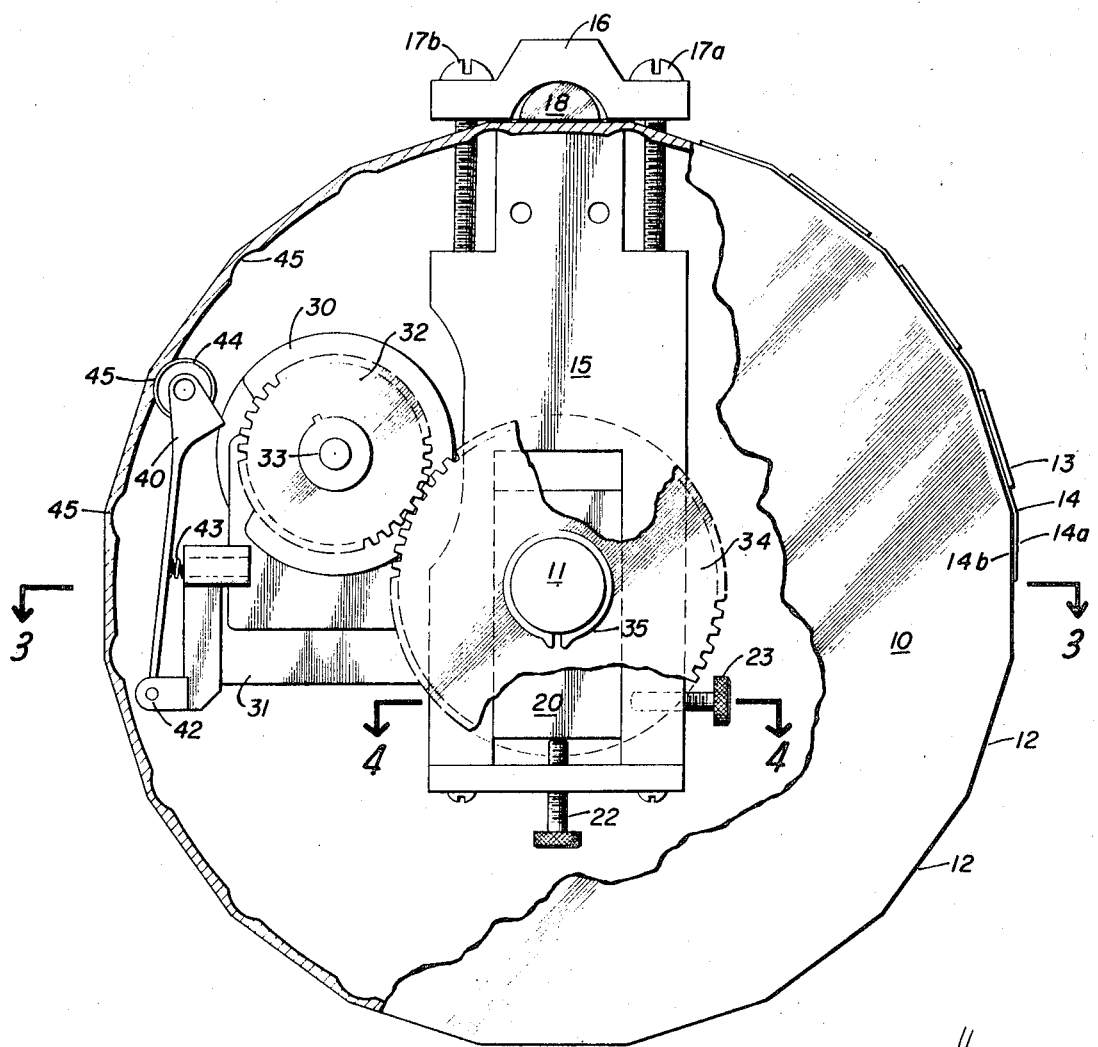
FIG. 2 shows a front view, partially cut away to show the operating mechanism.

Referring to all of the drawings, but in particular FIGS. 2, 3 and 4, a sample holding drum 10 is shown rigidly affixed to a shaft 11 at the axis of drum 10. Drum 10 has a plurality of sample surfaces 12, which are normal to a radius through the center of rotation of the drum 10 and of sufficient length and width to retain a sample, such as 13, affixed to drum 10 by means of a tape 14, having both surfaces 14(a) and 14(b) made adhesive. A mount 15 for the sample holder comprises a clamp 16 and two screws 17(a) and 17(b) which fit over goniometer half-shaft 18, clamping the half-shaft to the mount 15. A sliding shaft-mount 20 is secured to mount 15 by means of a plurality of square notches 21 (see FIG. 4). The sliding member is moved vertically by means of an adjusting screw 22 and secured in its position by a locking screw 23. Shaft 11 is mounted normal to the surface of sliding shaft-mount 20. A solenoid 30 is mechanically mounted through a frame 31 to mount 15. A gear 32 is rotatably secured to mount 31 through a shaft 33. A clutch and rotating tooth mechanism (see description of FIG. 3) couples the output from solenoid 30 to shaft 33. A second gear 34 couples the rotation of gear 32 to shaft 11. A clamp 35 retains the sample drum 10 to shaft 11.

The indexing of the drum is accomplished by an arm 40 attached by pivot 42 to frame 31. A biasing spring 43 is mounted inside a horizontal opening in shaft 31 and biases arm 40 away from frame 31. A roller 44 fits into peripheral indents 45. Each sample position has a corresponding peripheral indent.

Referring specifically to FIG. 3, the driving method for the sample holder is more clearly illustrated. Solenoid 30 has a plurality of teeth 50 adapted to rotate through a partial arc and move toward a second set of teeth 51. Teeth 51 are rigidly connected to shaft 33. Gear 32 likewise has an indexing means comprising a spring 52 and detent 53. Shaft 18 is driven by a motor 55 through a gear train 56 to gear 57 which rotates shaft 18. Gear 58 drives gear 59, which is adapted to rotate disc 60 which has attached thereto an arm 61 which carries an X-ray source 62. The detector 63 is mounted to the frame of the goniometer (not shown). Shaft 18 has secured thereonto, adjustable mechanical switch arms 91 and 92 which are adapted to engage plate 93, which in turn rotates about shaft 94. A "U"-shaped mechanical switching arm 95 operates switch arm 96 in a manner to engage either contact 97 or 98, depending upon which direction shaft 18 is rotating (either arm 92 or 91, respectively, will strike plate 93). Wire 100 is connected to a source of power through a resistor "R" and to ground through a capacitor "C." The switch arms 98 and 97 are connected through a wire 101 to solenoid 30 which is connected to ground through wire 102.

OPERATION

Figure 1A:
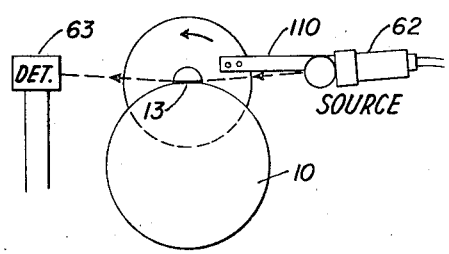
FIG. 1(a) and FIG. 1(b) show the movement of the sample changer with respect to the movement of the X-ray head during the operation of the goniometer.
Figure 1B:
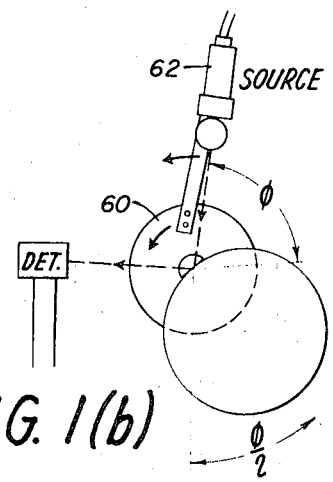

In order to fully comprehend the operation of the sample holder described herein, reference should be made to FIGS. 1(a) and 1(b). In FIG. 1(a) the sample drum 10 shows a sample 13 in place such that the top of sample 13 is directly in line with the flat surface, or diameter, of shaft 18. X-ray source 62 will then generate a beam of X-rays 110 which will strike sample 13, reflect from sample 13 and strike detector 63. The X-ray device is so geared by means of gear train 56, that disc 60 will rotate through an angle $\phi$ while the sample holder will rotate through a corresponding angle $\phi$, or half the number of degrees rotation as compared to the X-ray source. When the sample is completely tested, i.e., when the X-ray source 62 has reached the upper extent of its travel, such as shown in FIG. 1(b), switch 91 will contact plate 93, causing "U"-shaped arm 95 to strike switch arm 96, making contact with switch member 98. The contact will apply the source of power from the 20-volt battery to the solenoid 30. It should be noted at this point that the resistor and capacitor serve to cause a reduction in voltage at $E_2$ in order to protect the solenoid from damage, in case the switch remains closed for a long period of time. Simultaneously with the operation of switch 96, a second switch (not shown) will operate which will cause motor 55 to reverse direction, at which time arm 61 will rotate back to the horizontal position, as shown in FIG. 1(a). When the horizontal position is reached, mechanical switch arm 92 will strike plate 93, energizing solenoid 30.

When solenoid 30 is energized, teeth 50 are advanced toward teeth 51 and rotated simultaneously with its advance; thus, when teeth 50 strike teeth 51, they are rotated. Rotation of teeth 51 will lift detent 53 out of gear 32, causing gear 32 to rotate until the next detent position is reached. The rotation of gear 32 (see FIG. 2) will cause a corresponding rotation in both the gear 34 and sample drum 10. Rotation of drum 10 will lift detent roller 44 out of the peripheral indention 45 and cause rotation of drum 10 until the next detent position is reached. Thus, as shown, both the detent in gears 32 and the detent 45 in the sample drum 10 result in precise placement of the sample for the next operation of the goniometer. It is one of the important features of this invention that the samples shall be precisely placed in position since reliability of the entire apparatus depends principally upon the placement of the sample.

These samples are normally prepared by grinding material to be sampled and placing the material on glass slides. Since a variation of a few thousandths of an inch will cause errors in the operation of the goniometer, it has been found that if 20 glass slides are found to have uniform thickness, that the variation in thickness can be compensated by the following procedure. Lock nut 23 is loosened and adjusting screw 22 is rotated either clockwise or counterclockwise so that the upper surface of sample 13 is directly in line with the flat, or diameter, of shaft 18. Since the remainder of the glass slides have the same thickness as the glass slide used to adjust the sample holder, all the remaining samples will position automatically without adjustment on the part of the operator.

Mounting samples on the sample changer has been found extremely simple by placing on the surface of drum 10 a tape which has adhesive on both surfaces. When the tape is placed against the holder, it will adhere and any samples placed upon the tape will likewise adhere. Since the tape has extremely uniform thickness, no noticeable variations are detected in the samples mounted as above described. Other methods might be devised to hold the samples to the sample holder; however, the tape method has been found to be the most successful and the easiest to use. The tape may be used many times before it needs to be replaced.

It is of course obvious that the entire sample holder can be enclosed so that the environment of the samples can be precisely controlled. Such an enclosure would completely surround the sample holder and afford an inlet for insert gas or dry air or heated air or other environmental conditions as the necessity arises.

Changes may be made in the combination and arrangement of elements as heretofore set forth in this specification and shown in the drawings; it being understood that changes may be made in the embodiments disclosed without departing from the spirit and scope of the invention.

What is claimed is:

1. An automatic sample changer for a goniometer, said goniometer having an X-ray source, a rotational mount for said X-ray source, a mount reversing switch mechanically coupled to said mount so that said X-ray source will move through an angular rotation of a fixed number of degrees, a sample changer shaft axially mounted through said rotational mount and means for driving said sample shaft and said X-ray source such that said X-ray source passes through an angular rotation twice that of said sample shaft, said automatic sample changer comprising:

a sample changer mount having means to secure said mount to said sample changer shaft;
a second shaft;
means for securing said second shaft to said sample changer mount so that the axis of said second shaft is parallel to the axis of said sample changer shaft;
a drum-shaped sample holder having a plurality of flat surfaces formed on the outer periphery of said drum and wherein said surfaces are normal to a radius of said drum and adapted to hold a sample thereon;
power supply means;
solenoid means mounted to said sample changer mount;
means for coupling the output of said solenoid to said drum for rotating said drum through a fixed angular rotation;
detent means carried by said sample changer mount;
a plurality of spaced depressions on the inner surface of said drum adapted to receive said detent means and provide for a fixed angular rotation of said drum for each operation of said solenoid; and
means for connecting said solenoid to said power supply through said reversing switch wherein said means for securing said second shaft to said sample changer mount comprises a sliding shaft mount, means for securing said sliding shaft mount to said sample changer mount in a plane normal to the axis of said sample chamber shaft, means for adjusting the position of said sliding shaft mount, and locking means for securing the position of said sliding shaft mount whereby the second shaft can be moved perpendicular to the axis of said sample changer shaft so that the position of a sample with relation to the sample changer shaft can be adjusted to account for variations in thickness of a set of samples.

2. An automatic sample changer as described in claim 1 and additionally comprising a tape having a tacky surface on both sides of said tape for securing a plurality of samples to said flat surfaces on the periphery of said drum.

3. A device as described in claim 1 wherein said power supply includes a series resistor and a parallel capacitor across the output of said power supply such that when said solenoid is energized by said reversing switch, the voltage will be substantially reduced after said capacitor is discharged thereby preventing accidental burnout of said solenoid.

4. A device as described in claim 1 wherein said detent means comprises a pivotal arm attached to said first mentioned mount spring biasing means for urging said detent means away from said sample changer mount; and
roller means mounted on said detent means for engaging the spaced depressions on the inner surface of said drum and wherein said spaced depressions are cylindrical depressions having a diameter equal to the diameter of said roller.

* * * * *

PO-1050
(5/69)

UNITED STATES PATENT OFFICE
CERTIFICATE OF CORRECTION

Patent No. 3,654,460          Dated April 4, 1972

Inventor(s) Charles E. Payton et al

It is certified that error appears in the above-identified patent and that said Letters Patent are hereby corrected as shown below:

Column 3, line 38, insert --rotational-- after "said", first occurrence.

Signed and sealed this 22nd day of August 1972.

(SEAL)
Attest:

EDWARD M. FLETCHER, JR.
Attesting Officer

ROBERT GOTTSCHALK
Commissioner of Patent